United States Patent [19]
Hammond

[11] 3,845,633

[45] Nov. 5, 1974

[54] INTERCEPTOR FOR PREVENTING SHIP COLLISIONS WITH OFFSHORE POWER STATIONS AND THE LIKE

[75] Inventor: Roland P. Hammond, Oak Ridge, Tenn.

[73] Assignee: The United States of America as represented by the United States Atomic Energy Commission, Washington, D.C.

[22] Filed: Dec. 13, 1973

[21] Appl. No.: 424,256

[52] U.S. Cl.................................. 61/46.5, 61/1 F
[51] Int. Cl............................................. E02b 3/20
[58] Field of Search........... 9/8 R; 61/1 F, 5, 46, 48, 61/46.5; 114/0.5 F, 206 R

[56] References Cited
UNITED STATES PATENTS

| | | | |
|---|---|---|---|
| 3,010,284 | 11/1961 | Buzzell | 61/48 X |
| 3,653,213 | 4/1972 | Childers | 61/1 F |
| 3,691,774 | 9/1972 | Hard | 61/5 |
| 3,708,982 | 1/1973 | Blockwick | 61/1 F |

Primary Examiner—Paul R. Gilliam
Assistant Examiner—David H. Corbin
Attorney, Agent, or Firm—John A. Horan; David S. Zachry; Louis M. Deckelmann

[57] ABSTRACT

There is provided an encircling network of floating intercepting elements about a fixed installation in a body of water, each attached to radially extending anchor units whereby the network decelerates a ship or other engaging body to prevent collision with the installation. The anchors are designed to move across the floor of the body of water to produce a given drag whereby connecting cables are tensioned but not broken during the deceleration.

1 Claim, 4 Drawing Figures

INTERCEPTOR FOR PREVENTING SHIP COLLISIONS WITH OFFSHORE POWER STATIONS AND THE LIKE

BACKGROUND OF THE INVENTION

This invention was made in the course of, or under, a contract with the United States Atomic Energy Commission.

Consideration is being given to the construction of nuclear power stations, desalting plants, and other enterprises on moored barges or artificial islands offshore from coastal cities. One of the recognized hazards of such station sitings is the possibility of collision by ships. Although damage to the station might occur, the principal damage appears to be the burning of the ship's cargo or other environmental and physical detriments. Collision prevention can be provided in shallow waters by artificial rock reefs; however, other means are needed and must be provided in waters of depth greater than about 100 feet. The present invention was conceived to meet this need in a manner to be described hereinbelow.

SUMMARY OF THE INVENTION

It is the object of the present invention to provide a collision barrier or interceptor for protecting offshore moored stations and the like from accidental collision with ships.

The above object has been accomplished in the present invention by providing an anticollision system comprising an encircling network including a plurality of floating elements which support a continuous cable encircling an offshore power station or the like, with radially extending anchor elements attached to at least most of the floating elements with the anchors designed for a certain amount of drag whereby deceleration of a ship encountering the floating elements is accomplished, thus preventing its collision with the power station or the like.

DESCRIPTION OF THE PREFERRED EMBODIMENTS

Figure 1:
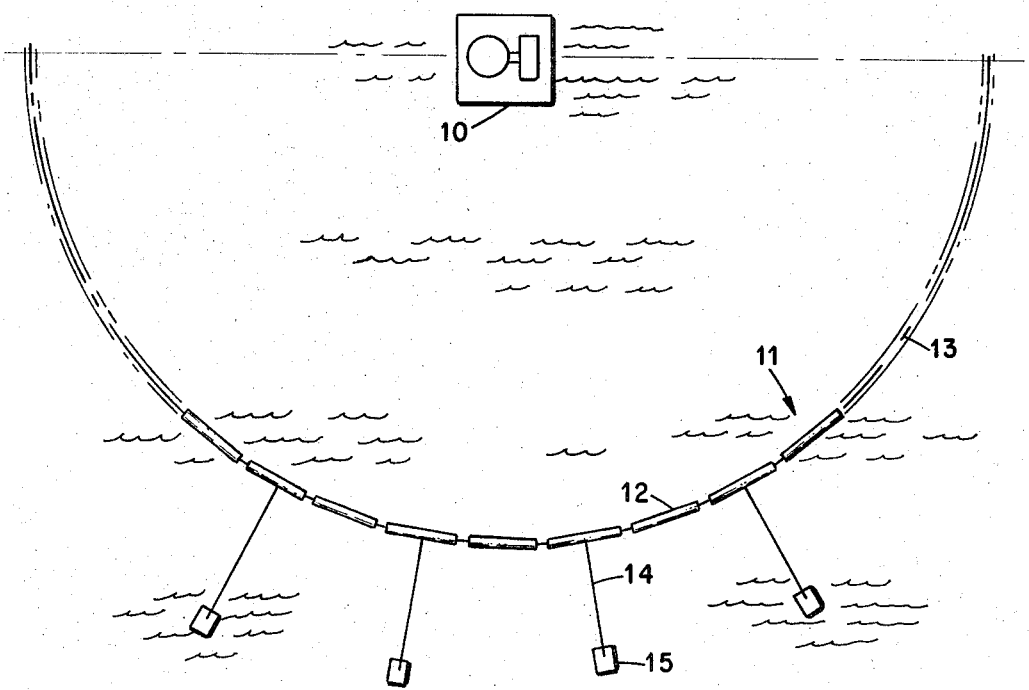
FIG. 1 is a plan view of an interceptor system of this invention.

Referring now to FIG. 1, an offshore power station 10, or the like, is surrounded by an encircling network 11 made up of floating elements 12. Each floating element either encases or is attached to a continuous, or semi-continuous, tension-resisting band 13 in the form of a cable or chain. Extending generally radially outward from each (or most) of the floating elements 12 is an anchor line 14 with an anchor 15, having specific characteristics, attached at the lower end thereof.

Figure 2:
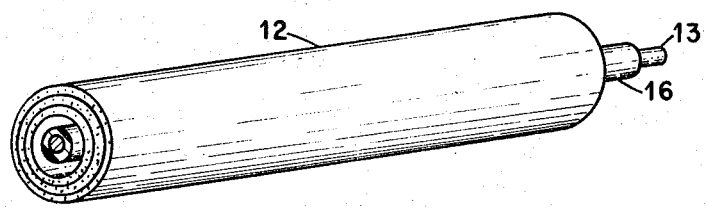
FIG. 2 is an isometric illustration of a floating element of the system of FIG. 1.
Figure 3:
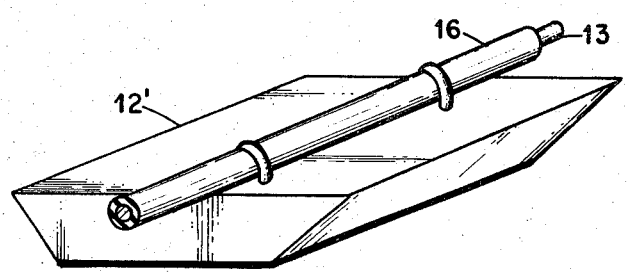
FIG. 3 is an isometric illustration of another form of floating element that could be used in the system of FIG. 1.

Preferably, the main barrier cable 13 might be a high-strength steel cable encased with a waterproof cover 16 of extruded nylon or the like as illustrated in FIGS. 2 and 3. As illustrated in FIG. 2, the flotation elements 12 may consist of hollow logs threaded by cable 13 having cover 16. Each log is formed with alternate layers of sheet metal and foamed plastic. Alternatively, the floats 12 may be air-entrained concrete with mesh reinforcement as illustrated in FIG. 3. In either case, the floats 12 should be crushable and yielding to the prow of a ship or the like but should resist full penetration to the cable line 13. It should be understood that other forms of float elements 12 could be utilized to accomplish the same function.

Figure 4:
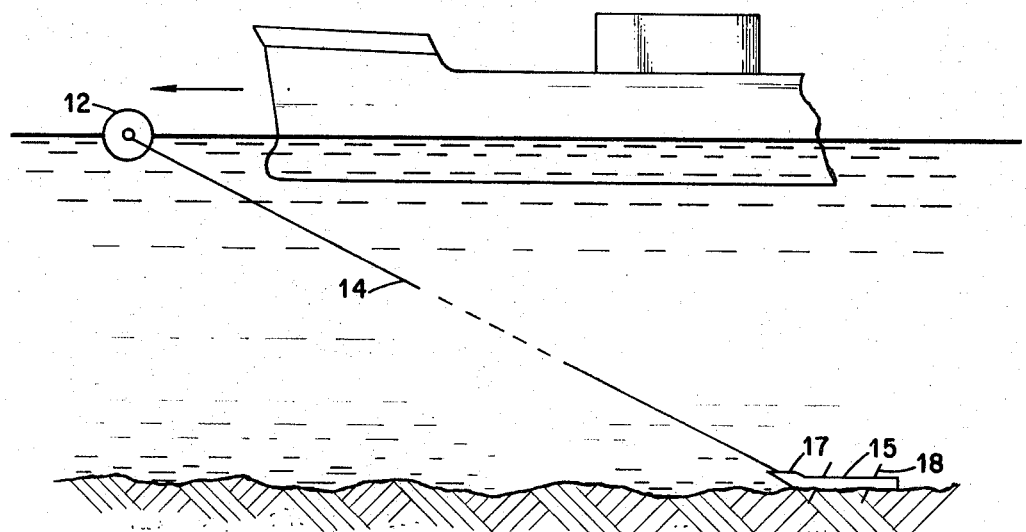
FIG. 4 is a vertical view of a portion of the system of FIG. 1 showing the anchoring means.

The anchor elements 15 are selected on the basis of the nature of the sea floor and the shape, size, and weight will differ for each type. Each anchor must be capable of being dragged along the floor, when a sufficient pull is exerted by its anchor line 14, but at the same time exerting a known and steady retarding force to such motion. By way of illustration, these anchors may be cast slabs of concrete or the like, such as shown in FIG. 4, having a turned-up forward portion 17 and one or more flukes or blades 18 projecting downward into the ocean floor to provide the resistance to the forward motion. A tension measuring element, not shown, may be included in the anchor system to extend or retract the flukes 18 until a preset tension exists in the anchor line 14.

In normal anchoring procedures, an anchor line 14 should be of the order of four to five times the water depth to prevent lifting the anchor from the sea floor. Since the power station (or other installation) to be protected will be anchored where depths may be 100-1,000 feet, the lengths of the anchor lines 14 will be about 400-4,000 feet, respectively. Each line 14 must withstand a tensile force commensurate with an anchor drag force.

In operation, the barrier system is floated into position around the facility and fixed by the anchor lines and drag anchors. If a ship approaches the facility, it will engage the floats and cable and push in the direction of its movement. As the floats and cable move, one or more of the anchor lines will become tensioned and transfer the thrust of the ship to the drag anchor or anchors. If the anchor — sea bottom resistance is exceeded, the anchor will move across the sea bottom, keeping a set retarding force upon the anchor line. As the ship moves the barrier farther, more anchor lines become tensioned and additional drag is applied until a sufficient decelerating force is applied to gradually bring the ship to rest.

For any maximum ship weight and speed, it is possible to calculate the strength needed for the various elements of the present barrier system, the required drag, and the distance to halt the travel of the ship. For example, assume a 500,000-ton vessel moving at 22 statute miles per hour (32 feet per second) engages the barrier and the number of drag anchors finally activated as 10. If each anchor and anchor line has a maximum retarding force of 500 tons, the total drag is 5,000 tons which the main cable 13 must withstand. If this amount of drag is applied to the specific vessel, the deceleration is 1/100 g, or 0.32 ft/sec$^2$. Thus, 100 seconds would be needed to completely stop the ship and the distance traveled would be 1,600 feet, roughly one-fourth mile. A specific design for an installation would take into account the likelihood of a vessel of some standard size and speed in order to ascertain the individual design parameters.

Although the barrier system of the present invention was designed specifically to safely retard ships, other obstacles such as icebergs would likewise be deterred from physical contact with the facility.

The present invention has been described by way of the illustration rather than by limitation and it should be apparent that it is equally applicable in fields other than those described. For example, the barrier system of the present invention could be utilized to protect offshore oil wells from collisions with ships and/or icebergs and the like.

What is claimed is:

1. A floating barrier to protect a fixed offshore installation in a body of water from collision with a ship comprising a tension-resisting, high-strength steel cable encased with a water-proof cover, said cable encircling said installation; a plurality of crushable float elements spaced along and supporting said cable to maintain said cable near the surface, each of said float elements being a hollow log, said encased cable being threaded through all of said float elements, each of said hollow log floats comprising alternate layers of sheet metal and foamed plastic; and a plurality of anchors equal in number to said float elements with each anchor connected to a respective float element and disposed radially outward from said installation and cable, to maintain said cable generally in circular configuration surrounding said installation, the connection between each float element and its associated anchor being at least four times as long as the water depth under the respective float element to prevent lifting the anchor from the sea floor, each of said anchors being provided with at least two flukes projecting downward from the anchor into the floor of the body of water to provide a fixed retarding force upon said cable to oppose any force by a colliding ship directed against said cable radially inward toward said installation such that the combined retarding force effected by the affected anchors will prevent collision of said ship with said installation.

* * * * *